(12) United States Patent
Schneider et al.

(10) Patent No.: US 10,803,269 B2
(45) Date of Patent: Oct. 13, 2020

(54) SCAN MODULE AND READER FOR, AND METHOD OF, ELECTRO-OPTICALLY READING A TARGET BY ADJUSTING READING PARAMETERS BASED ON TARGET DISTANCE

(71) Applicant: SYMBOL TECHNOLOGIES, LLC, Lincolnshire, IL (US)

(72) Inventors: Gary G. Schneider, Stony Brook, NY (US); James R. Giebel, Centerport, NY (US); Peter Fazekas, Bayport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 980 days.

(21) Appl. No.: 14/927,678

(22) Filed: Oct. 30, 2015

(65) Prior Publication Data

US 2020/0160015 A1 May 21, 2020

(51) Int. Cl.
*G06K 7/10* (2006.01)

(52) U.S. Cl.
CPC ..... *G06K 7/10841* (2013.01); *G06K 7/10881* (2013.01); *G06K 2007/10485* (2013.01); *G06K 2007/10524* (2013.01)

(58) Field of Classification Search
CPC ....... G06K 7/10722; G06K 9/22; G06K 9/228
USPC .................. 235/472.01, 462.45, 454, 462.43
See application file for complete search history.

(56) References Cited

U.S. PATENT DOCUMENTS

| | | | |
|---|---|---|---|
| 5,635,700 A | 6/1997 | Fazekas | |
| 6,062,475 A * | 5/2000 | Feng | G06K 7/10722 235/462.01 |
| 2004/0021951 A1* | 2/2004 | Maeda | G02B 7/021 359/643 |
| 2006/0018214 A1* | 1/2006 | Fujii | G11B 7/082 369/44.37 |
| 2007/0295814 A1* | 12/2007 | Tanaka | G06K 7/10722 235/454 |

* cited by examiner

*Primary Examiner* — Edwyn Labaze
(74) *Attorney, Agent, or Firm* — Yuri Astvatsaturov (57) ABSTRACT

First and second photodetectors having first and second collection areas receive return laser light that is reflected and scattered from a target, and generate first and second analog electrical output signals having first and second magnitudes. The second collection area is in close proximity to the first collection area. The first output signal is processed to obtain information related to the target. The first and the second output signals are processed, preferably by determining a ratio of the second magnitude to the first magnitude. A working distance to the target is determined based on the determined ratio. One or more reading parameters by which the target is electro-optically read are adjusted based on the determined working distance.

17 Claims, 6 Drawing Sheets

SCAN MODULE AND READER FOR, AND METHOD OF, ELECTRO-OPTICALLY READING A TARGET BY ADJUSTING READING PARAMETERS BASED ON TARGET DISTANCE

BACKGROUND OF THE INVENTION

The present disclosure relates generally to a scan module and a reader for, and a method of, electro-optically reading a target located in a range of working distances relative to the module/reader and, more particularly, to accurately and rapidly determining the working distance at which the target is located, and to dynamically adjusting one or more reading parameters by which the target is read as a function of the determined working distance.

Moving laser beam readers or laser scanners, as well as solid-state imaging readers, have long been used as data capture devices to electro-optically read targets, such as one-dimensional bar code symbols, particularly of the Universal Product Code (UPC) type, printed on labels associated with products in many venues, such as supermarkets, warehouse clubs, department stores, and other kinds of retailers, as well as many other venues, such as libraries and factories. The moving laser beam reader generally includes a scan engine or module mounted in a housing having a light-transmissive window. The module includes a laser for emitting a laser beam through the window to the symbol, a focusing lens assembly for focusing the laser beam to form a beam spot having a certain size at a focal plane in a range of working distances relative to the window, a scan component for repetitively scanning the beam spot over a scan angle across the symbol in a scan pattern, for example, a scan line, across the symbol multiple times per second, and a photodetector for detecting return light reflected and/or scattered from the symbol through the window, and for converting the detected return light into an analog electrical information signal bearing information related to the symbol. This analog electrical information signal varies in amplitude as a function of time due to the time-varying return light along the scan line, and varies in frequency as a function of the density of the symbol, as well as the distance at which the symbol is being read. The moving laser beam reader also includes signal processing receiver circuitry including a digitizer for digitizing the variable analog information signal, and a programmed microprocessor or controller for decoding the digitized signal based upon a specific symbology used for the symbol. The decoded signal identifies the product and is transmitted to a host, e.g., a cash register in a retail venue, for further processing, e.g., product price look-up or product inventorying.

The imaging reader generally also includes a module mounted in a housing. The module includes a solid-state imager having a one- or two-dimensional array of cells or photosensors, which correspond to image elements or pixels in a field of view of the imager, and an imaging lens assembly for capturing light from a symbol and projecting the captured light onto the imager. The imager may be a one- or two-dimensional charge coupled device (CCD) or a complementary metal oxide semiconductor (CMOS) device, together with associated electronic circuits for producing electrical signals corresponding to a one- or two-dimensional array of pixel information over the field of view, and is similar to that used in a digital camera. A programmed microprocessor or controller is used for processing and decoding the electrical signals to read each captured image. To assist an operator in locating and reading a desired symbol, the imaging reader is often equipped with an aiming assembly having an aiming light source, e.g., an aiming laser for generating a laser beam, and aiming optics for generating a visible aiming pattern, such as a spot or a crosshair pattern, from the laser beam. The operator trains the aiming pattern on the symbol to be imaged during an aiming mode prior to a reading mode.

In one advantageous embodiment, an operator holds the housing in his or her hand, and aims the housing at the symbol, and then initiates the data capture and the reading of the symbol by manual actuation of a trigger on the housing. The symbol can be located anywhere in a range of working distances relative to the window. For example, the symbol can be located at the window, or advantageously, anywhere up to 600 inches away from the window. For better reading performance, the reading parameters by which the reading is performed should be different at a near zone of the range (close to the window) as compared to a far zone of the range (distant from the window). For example, for a laser scanner, at the far zone, it is preferred for the scan angle by which the laser beam is scanned by the scan component to be narrow, whereas, at the near zone, it is preferred for the scan angle to be wider.

It is known in the art to adaptively change one or more of the reading parameters as a function of working distance. The working distance can be determined using a range finder, or, in some applications, by estimating the working distance by analyzing the amplitude of the information signal. A low amplitude indicates that the symbol is farther away, whereas a high amplitude indicates that the symbol is close. Yet, all these techniques do not provide an accurate or rapid determination of the working distance. In some cases, the variation of the amplitude of the information signal is not monotonic, thereby leading to erroneous estimates of the working distance.

Accordingly, there is a need to accurately and rapidly determine the working distance to enhance reader performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The structural and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to a scan engine or module for electro-optically reading a target, e.g., a one-dimensional bar code symbol, located in a range of working distances relative to the scan module. When mounted in a moving beam reader, the scan module includes a laser, typically a semiconductor laser diode, mounted on a support, and operative for emitting a laser beam, and a scan component also mounted on the support, for scanning the laser beam across the target for reflection and scattering therefrom as return laser light. When mounted in an imaging reader, the scan module includes a solid-state imager for capturing an image of the symbol, and an aiming assembly that includes an aiming laser for emitting an aiming laser beam, and aiming optics for modifying the laser beam to form on the symbol an aiming laser light pattern that is reflected and scattered therefrom as return laser light.

The module further includes a first photodetector having a first collection area that is positioned on the support to receive the return laser light. The first photodetector is operative for generating a first analog electrical output signal having a first magnitude upon receipt of the return laser light. The module still further includes a second photodetector having a second collection area that is positioned on the support to receive the return laser light and that is in close proximity to the first collection area. The second photodetector is operative for generating a second analog electrical output signal having a second magnitude upon receipt of the return laser light. Signal processing circuitry on the support includes a controller for processing the first output signal to obtain information related to the target, for processing the first and the second output signals to determine a working distance to the target from the module, and for modifying at least one reading parameter by which the reading is performed based on the determined working distance.

In a preferred embodiment, the first and the second collection areas are generally planar and are situated on a common, generally planar substrate. The first and the second collection areas have optical axes that are substantially collinear and that are generally perpendicular to the substrate. The first collection area has a plurality of sides, and the second collection area surrounds or bounds at least three of the sides of the first collection area.

Preferably, the controller processes the first and the second output signals to determine a ratio of the second magnitude to the first magnitude, determines the working distance to the target from the scan module based on the determined ratio, and modifies one or more of the reading parameters by which the reading is performed based on the determined working distance. The ratio is a proportion of the second magnitude to the first magnitude. Since both photodetectors are active to receive the return laser light, either from the return laser light scanned across the target, or from the return laser light aiming pattern on the target, the ratio and the working distance are both accurately calculated. Once an accurate working distance has been calculated, one or more of the following reading parameters may be dynamically modified in real-time: turning an automatic gain circuit (AGC) in the signal processing circuitry on or off; adjusting a bandwidth of a receiver filter in the signal processing circuitry; adjusting a gain of at least one receiver amplifier in the signal processing circuitry; adjusting a scan angle over which the laser beam is scanned by the scan component; and adjusting a power level of the laser beam emitted by the laser.

Another aspect of this disclosure relates to a reader for electro-optically reading a target located in a range of working distances relative to the reader. The reader is either a moving laser beam reader or an imaging reader. The reader includes a housing, typically a handheld housing, having a light-transmissive window. The above-described module is mounted in the housing, and the above-described photodetectors receive the return laser light, either from the return laser light scanned across the target, or from the return laser light aiming pattern on the target, through the window.

A method, in accordance with still another aspect of this disclosure, of electro-optically reading a target located in a range of working distances, is performed by the following steps: emitting a laser beam from a module to the target for reflection and scattering therefrom as return laser light. In one embodiment, the laser beam is scanned across the target. In another embodiment, the laser beam is an aiming laser light beam that is projected onto the target. The method is further performed by positioning a first collection area of a first photodetector to receive the return laser light, and to generate a first analog electrical output signal having a first magnitude upon receipt of the return laser light; and by positioning a second collection area of a second photodetector to receive the return laser light, and to generate a second analog electrical output signal having a second magnitude upon receipt of the return laser light. The second collection area is configured to be in close proximity to the first collection area. The first output signal is processed to obtain information related to the target. The first and the second output signals are processed to determine a working distance to the target from the module. One or more reading parameters by which the reading is performed are modified, preferably in real-time, based on the determined working distance. Advantageously, the first and the second output signals are processed to determine a ratio of the second magnitude to the first magnitude. The working distance to the target from the module is determined based on the determined ratio. The reading parameters are modified based on the determined working distance.

Figure 1:
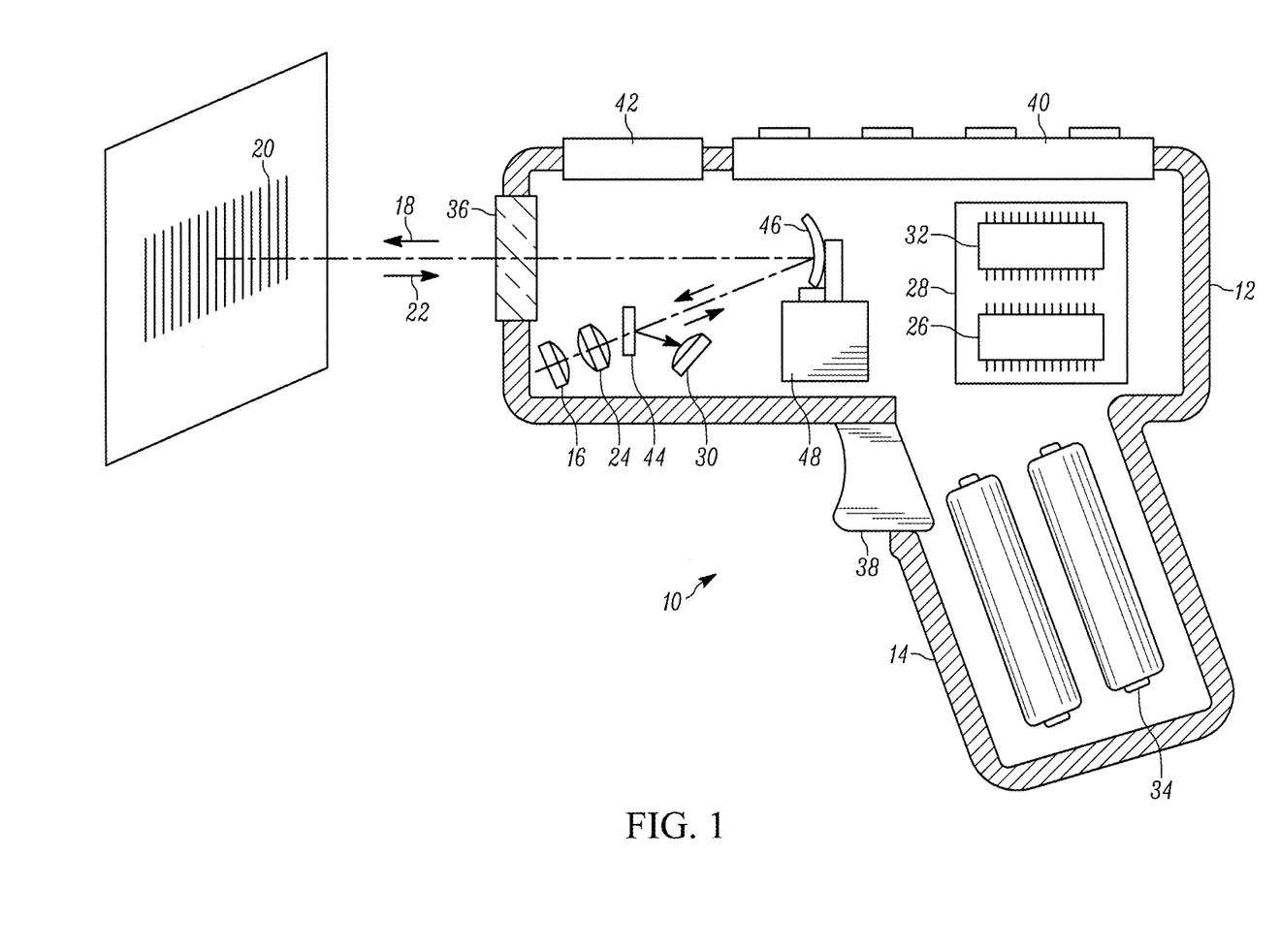
FIG. 1 is a schematic view of a handheld moving laser beam reader operative for electro-optically reading a symbol in accordance with the present disclosure.

Turning now to the drawings, FIG. 1 depicts a handheld, moving laser beam scanner or reader 10 implemented in a gun-shaped housing 12 having a pistol-grip type of handle 14. The housing 12 contains a laser light source 16, preferably a semiconductor laser diode having an output laser wavelength of about 650 nm±15 nm, for emitting an outgoing laser beam 18 to a target, such as a bar code symbol 20, for reflection and scattering therefrom; a detector assembly 30, as described more fully below, for detecting incoming return light 22; a focusing optical assembly 24, preferably one or more focusing lenses, for focusing the outgoing laser beam 18 as a beam spot on the symbol 20; an application specific integrated circuit (ASIC) 26 mounted on a printed circuit board (PCB) 28; a programmed microprocessor or controller 32, also preferably mounted on the PCB 28; and a power source or battery pack 34, preferably mounted in the handle 14. A light-transmissive window 36 at a front end of the housing 12 allows the outgoing laser light beam 18 to exit the housing 12, and the incoming return light 22 to enter the housing 12. A user holds the reader 10 by the handle 14, and aims the reader 10 at the symbol 20, preferably anywhere in a range of working distances away from the window 36. To initiate reading, the user pulls a trigger 38 on the handle 14. The reader 10 may optionally include a keyboard 40 and a display 42 readily accessible to the user.

As further depicted in FIG. 1, the laser beam 18 emitted by the laser light source 16 passes through a partially-silvered mirror 44 to a scan component or oscillating scan mirror 46, which is coupled to a drive motor 48, preferably energized when the trigger 38 is manually pulled. The mirror 46 reflects the outgoing laser beam 18 in an outward direction through the window 36. The oscillation of the mirror 46 causes the outgoing laser beam 18 to sweep back and forth over a scan angle (see FIG. 7) in a desired scan pattern, e.g., a scan line 50 (see FIG. 2), across the symbol 20. The incoming return light 22 passes in an opposite inward direction through the window 36 and reflects off of the scan mirror 46 and the partially-silvered mirror 44 and impinges on the detector assembly 30. As described below, the detector assembly 30 collects the incoming return light 22 over a field-of-view (FOV) 52 (see FIG. 2) and produces an analog electrical output signal proportional to the intensity of the incident return light 22.

Figure 2:
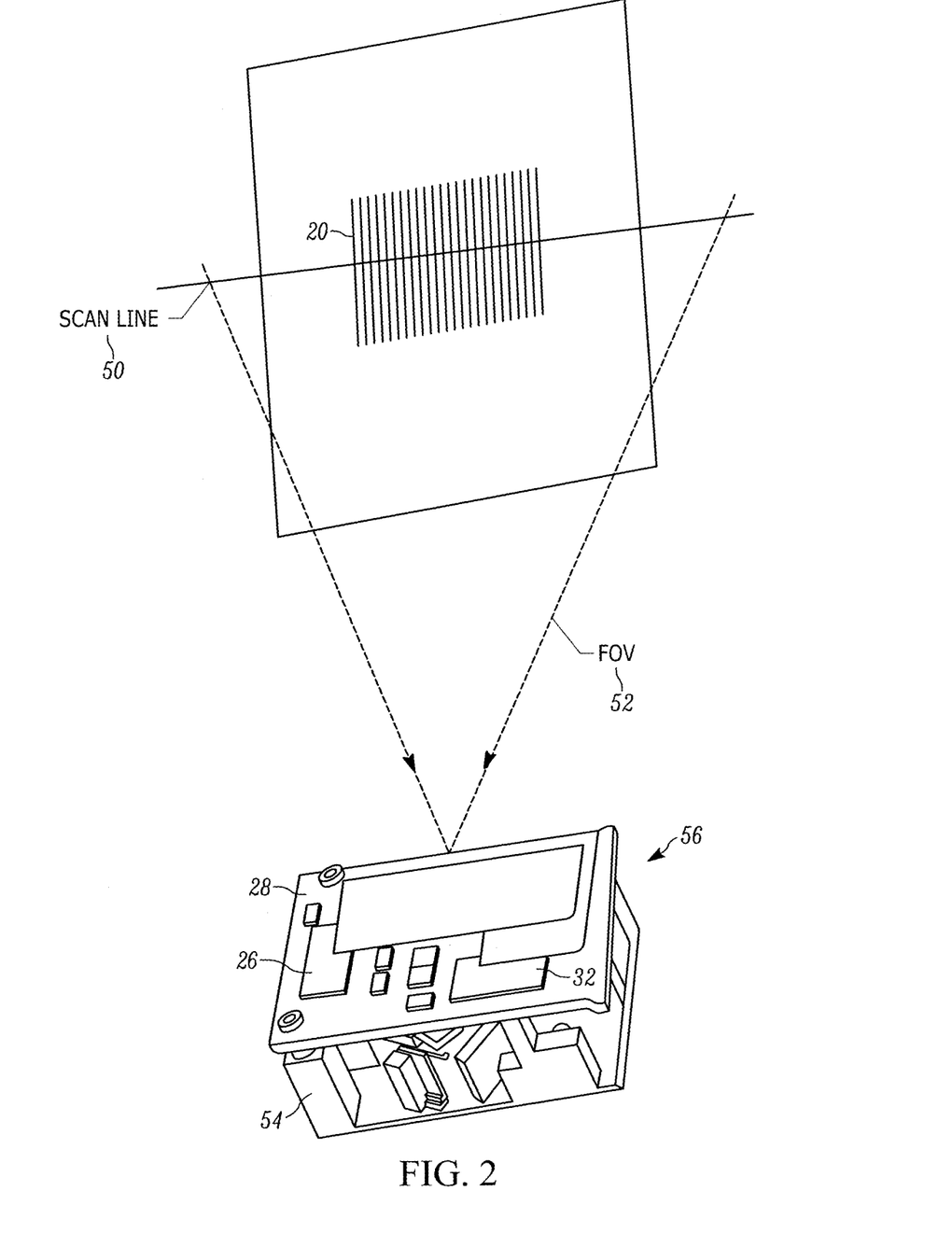
FIG. 2 is a perspective view of a scan module for use in the reader of FIG. 1.

As shown in FIG. 2, the aforementioned reader components, i.e., the laser light source 16, the focusing optical assembly 24, the partially-silvered mirror 44, the detector assembly 30, the drive motor 48 and its mirror 46, the ASIC 26, the controller 32, and the PCB 28 are all mounted on, and supported by, a common box-like, parallelepiped-shaped support 54 to constitute a scan engine or module 56. The module 56 is a self-contained unit that is mounted inside the housing 12.

Figure 7:
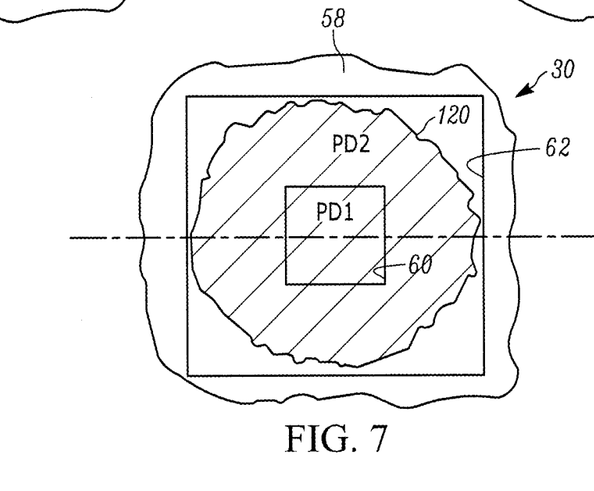
FIG. 7 is a front view of the dual-photodetector assembly of FIG. 5 depicting return light thereon from a close-in symbol.

It will be understood that the illustrated gun-shaped reader 10 is just one example of a reader that can be used with this invention, because myriad other shapes could be utilized. It will also be understood that the illustrated arrangement of the components inside the reader is arbitrary and can be changed, and that some of the components, e.g., the mirror 44 and/or the focusing optical assembly 24, could be eliminated in some configurations. A variety of mirror and motor configurations can be used to move the laser beam in the desired scan pattern. For example, the mirror 46 need not be a concave mirror as illustrated in FIG. 1, but could be a planar mirror as illustrated in FIG. 7, that is repetitively and reciprocally driven in alternate circumferential directions over the scan angle about a drive shaft on which the planar mirror is mounted.

Figure 3:
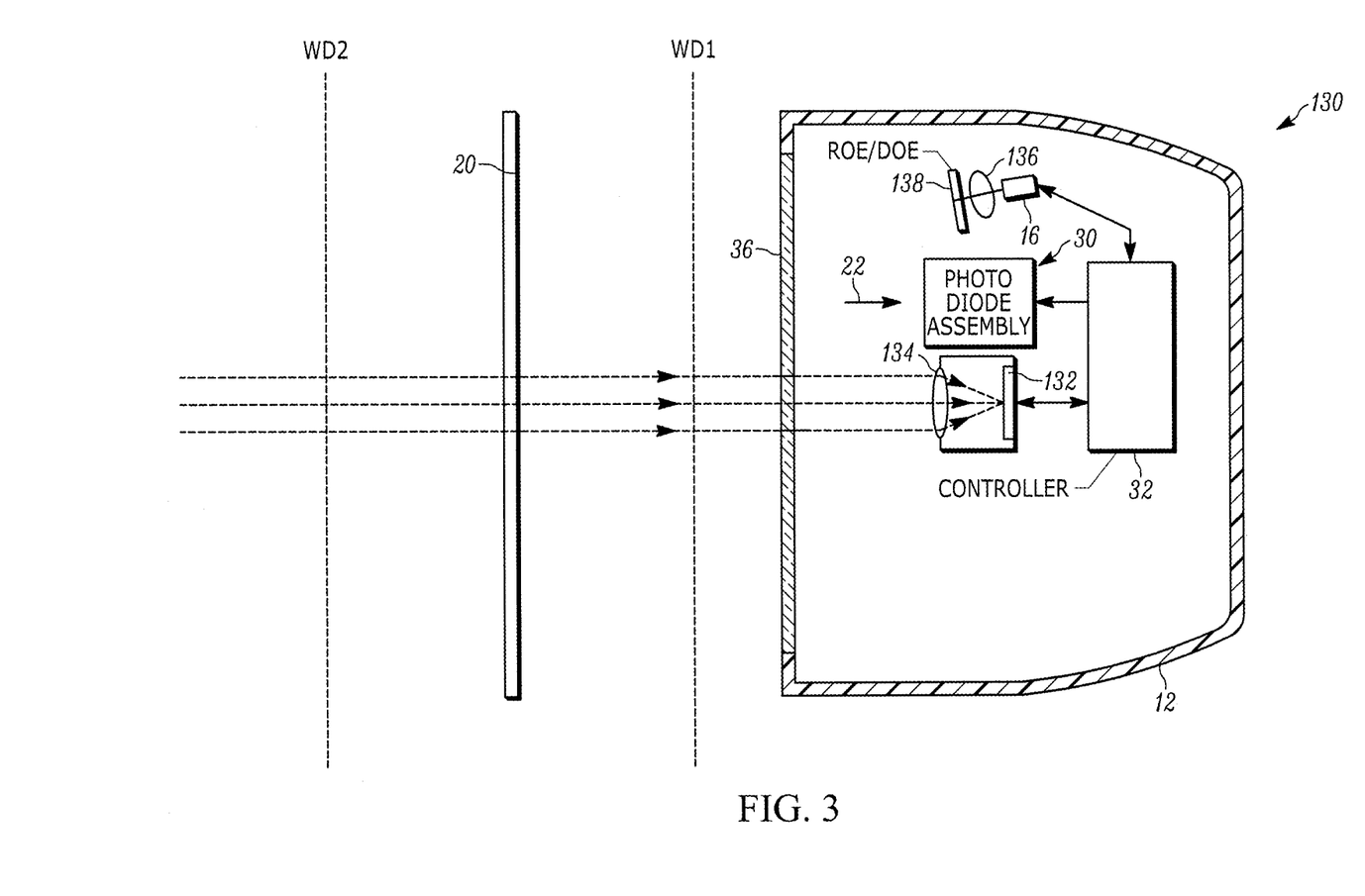
FIG. 3 is a schematic view of an imaging reader operative for electro-optically reading a symbol in accordance with the present disclosure.

An imaging reader 130 is schematically shown in an interior plan view in FIG. 3, and includes a housing 12 having a light-transmissive window 36. Like parts in FIG. 3 have been identified with like reference numerals from FIGS. 1 and 2 for ease of understanding. A scan engine or module is mounted in the housing 12 and includes a solid-state imager 132, preferably a one- or two-dimensional, charge coupled device (CCD) or a complementary metal oxide semiconductor (CMOS) device, each having an array of cells or sensors operative for capturing light over its field of view from a target, such as the symbol 20, through the window 36 and focused by an imaging lens assembly 134 onto the imager 132 during a reading mode of operation. The imaging lens assembly 134 preferably has a variable focus and enables image capture over a range of working distances between a close-in distance WD1 and a far-out distance WD2 relative to the window 36. The sensors produce electrical target signals corresponding to a one- and/or two-dimensional array of pixel information indicative of an image of the symbol 20. The electrical target signals are processed by a controller or programmed microprocessor 32 into data indicative of the symbol 20 being read. The module also includes an aiming light assembly that is operative, during an aiming mode of operation prior to the reading mode, for projecting on the symbol 20 an aiming light pattern, e.g., a light spot or a crosshairs pattern. In a preferred embodiment, the aiming light assembly includes a laser 16 for emitting a laser beam 18, a collimating element 136 for collimating the laser beam to form a collimated beam, and a pattern shaping optical element 138, such as a diffractive optical element (DOE), or a refractive optical element (ROE), for modifying the collimated beam to form the aiming light pattern on the symbol 20. As described below, a detector assembly 30 collects the return laser light 22 that is reflected and scattered off the symbol 20 from the aiming light pattern. The aforementioned components, e.g., the imager 132, the imaging lens assembly 134, the aiming light assembly, and the detector assembly 30 are all mounted on a common support, such as a scan engine or module 56.

As described above, the symbol 20 can be located anywhere in a range of working distances relative to the window 36 or module 56. For example, the symbol 20 can be located at the window 36 or module 56, or advantageously, anywhere up to 600 inches away from the window 36 or module 56. For better reading performance, the reading parameters by which the reading is performed should be different at a near zone of the range (close to the window 36 or module 56) as compared to a far zone of the range (distant from the window 36 or module 56). Although it is known in the art to adaptively change the reading parameters as a function of working distance, the known techniques do not provide a very accurate or rapid determination of the working distance. One aspect of this disclosure is to provide a more accurate and more rapid determination of the working distance so that the reading parameters may be more accurately adjusted, preferably dynamically in real-time.

Figure 5:
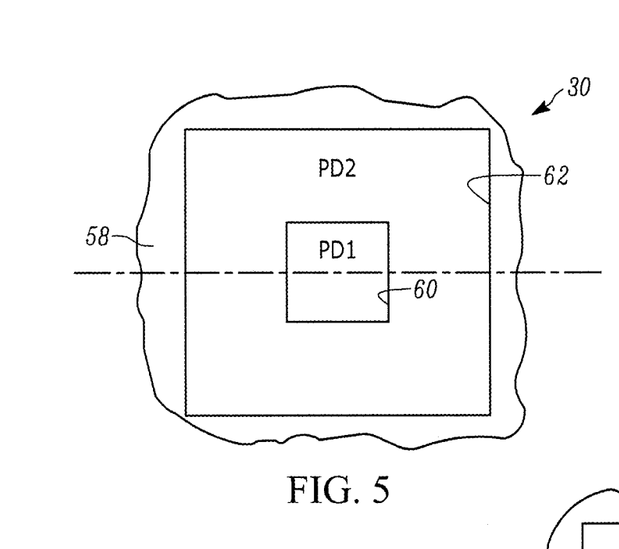
FIG. 5 is a front view of a dual-photodetector assembly employed in the circuit of FIG. 4.

In accordance with this disclosure, the detector assembly 30, as best shown in FIG. 5, includes a first photodetector PD1 having a first light collection area 60 that is positioned on the module 56 to receive the return laser light 22, and a second photodetector PD2 having a second light collection area 62 that is also positioned on the module 56 to receive the return laser light 22. The first light collection area 60 is in close proximity to, or at least partly, and, as shown, entirely, surrounded by, the second collection area 62. The first photodetector PD1 can thus be termed an interior or central photodetector, while the second photodetector PD2 can be termed an exterior photodetector. The first and the second collection areas 60, 62 are generally planar and are situated, typically by wafer-scale processing, on a common, generally planar substrate 58, preferably made of silicon. The first and the second collection areas 60, 62 have centers with optical axes that pass therethrough and that are generally perpendicular to the substrate 58. These optical axes are substantially collinear, or are parallel to each other. Although PD1 and PD2 have been illustrated with collection areas that are shaped as squares, it will be understood that many other shapes, e.g., circular, may be used. Although the first collection area 60 of PD1 has been illustrated as being centrally and symmetrically located within the second collection area 62 of PD2, it will be understood that this need not be; for example, in a preferred manufacturing process, the first collection area 60 can be offset from, or shifted to an asymmetrical position relative to, the second collection area 62 such that the second collection area 62 bounds the first collection area 60 on only three of its four sides.

Figure 4:
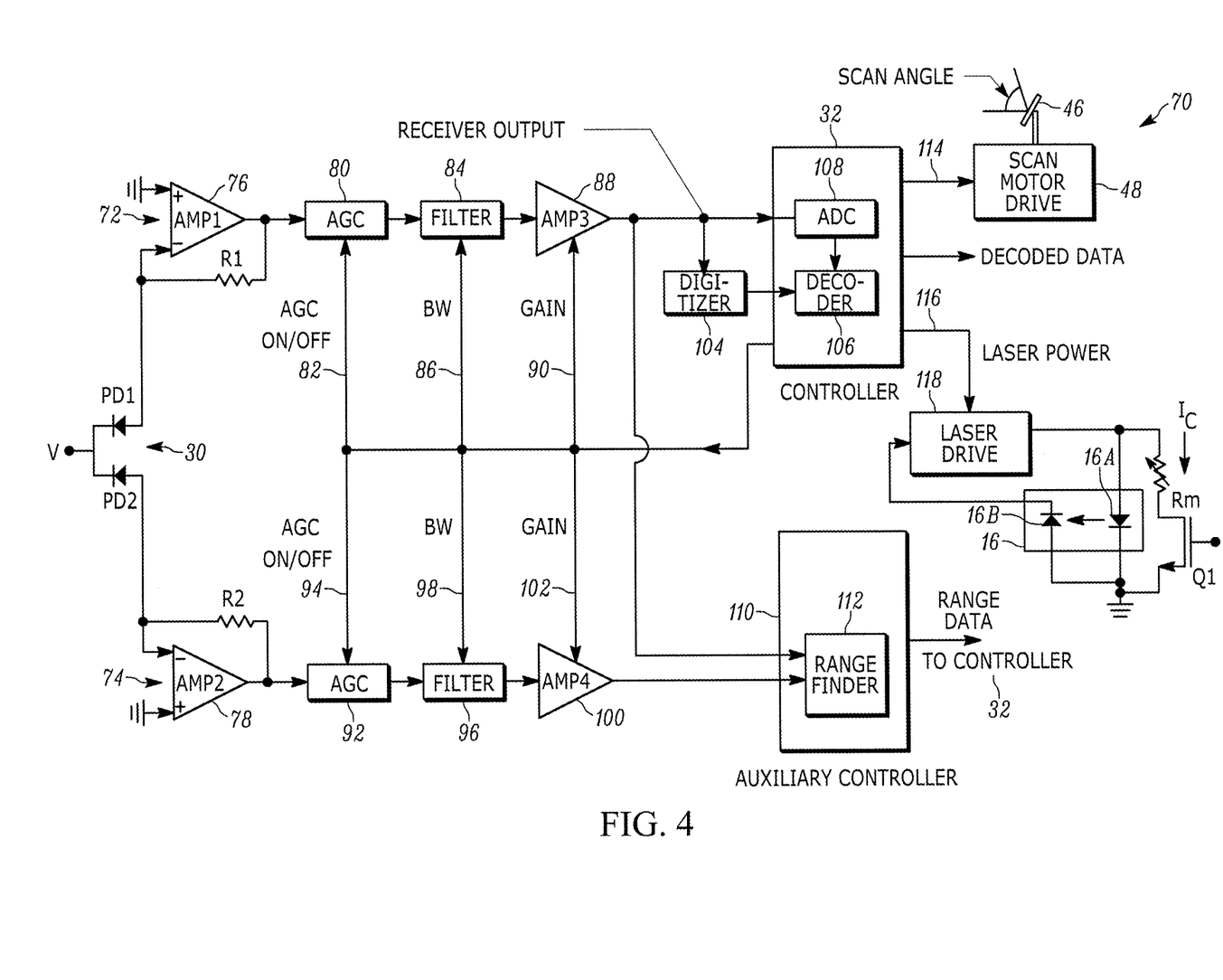
FIG. 4 is an electrical circuit schematic of a signal processing receiver circuit for use in the reader of FIG. 1 or 3.

The detector assembly 30, as best shown in FIG. 4, is connected to a signal processing circuit 70. The cathodes of the photodetectors PD1, PD2 are connected together and connected to a common voltage source. The first photodetector PD1 generates a first analog electrical output signal having a first magnitude upon receipt of the return laser light 22. The signal processing circuit 70 includes a first receiver channel 72 connected to the anode of the first photodetector PD1 to process the first output signal. The second photodetector PD2 generates a second analog electrical output signal having a second magnitude upon receipt of the return laser light 22. The signal processing circuit 70 includes a second receiver channel 74 connected to the anode of the second photodetector PD2 to process the second output signal.

A first amplifier (AMP1) 76, advantageously configured as a transimpedance amplifier having a resistor R1, increases the amplitude of the first output signal received from the first photodiode PD1, and a second amplifier (AMP2) 78, advantageously also configured as a transimpedance amplifier having a resistor R2, increases the amplitude of the second output signal received from the second photodiode PD2. The amplified signal in the first channel 72 is now conducted to an automatic gain controller 80 (AGC) having an on/off control input under the control of the controller 32 over a control line 82, at least one active low-pass filter 84 having an adjustable bandwidth (BW) under the control of the controller 32 over a control line 86, and at least one amplifier 88 (AMP3) having an adjustable gain to increase the amplitude of the output signal under the control of the controller 32 over a control line 90. Similarly, the amplified signal in the second channel 74 is now conducted to an automatic gain controller 92 (AGC) having an on/off control input under the control of the controller 32 over a control line 94, at least one active low-pass filter 96 having an adjustable bandwidth (BW) under the control of the controller 32 over a control line 98, and at least one amplifier 100 (AMP4) having an adjustable amplitude to increase the gain of the output signal under the control of the controller 32 over a control line 102.

The signal processing receiver circuit 70 also includes a digitizer 104 in the first channel 72, which digitizes the first output signal from the amplifier 88 by processing the first output signal with differentiating circuits, peak detectors, multiplexers, logic elements, and comparators. The digitizer 104 processes the first output signal to produce a pulse signal where the widths and spacings between the pulses correspond to the widths of the bars and the spacings between the bars of the symbol 20. The digitizer 104 serves as an edge detector or wave shaper circuit, and threshold points set by the digitizer 104 determines what points of the first output signal represent bar edges. The pulse signal from the digitizer 104 is applied to a decoder 106, typically incorporated as software in the programmed controller 32, which will also have associated program memory and random access data memory. The controller 32 also has an analog-to-digital converter (ADC) 108 connected to the decoder 106 and to the output of the amplifier 88. The decoder 106 first determines the pulse widths and spacings of the first output signal from the digitizer 104. The decoder 106 then analyzes the widths and spacings to find and decode a legitimate bar code symbol. This includes analysis to recognize legitimate characters and sequences, as defined by the appropriate code standard or symbology. The controller 32 then outputs and communicates the decoded data with an external host (not illustrated) over an interface.

The signal processing receiver circuit 70 also includes an auxiliary controller 110 in the second channel 74. A range finder 112, typically incorporated as software in the auxiliary controller 110, is employed to find the working distance at which the symbol 20 being read is located. The range finder 112 may also be hardware-based. The first and the second output signals exiting the amplifiers 88, 100 in both channels 72, 74 are conducted to the range finder 112, which, in a preferred embodiment, calculates a ratio of the second magnitude of the second output signal to the first magnitude of the first output signal. This ratio is a quotient in which the second magnitude of the second output signal is in the numerator, and in which the first magnitude of the first output signal is in the denominator. The range finder 112 outputs this ratio as range data to the controller 32, and then, the controller 32 determines a working distance to the symbol 20 based on this ratio, and, as explained below, modifies one or more reading parameters by which the reading is performed based on the determined working distance.

Figure 6:
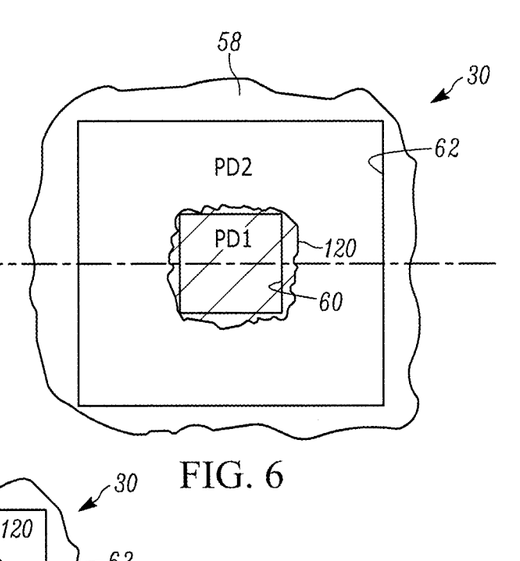
FIG. 6 is a front view of the dual-photodetector assembly of FIG. 5 depicting return light thereon from a far-away symbol.

FIGS. 6-7 depict a generally circular image 120 of the laser spot focused on the photodiodes PD1 and PD2. As the symbol 20 is located farther and farther away from the window 36, the image 120 of the laser spot on the photodiodes PD1 and PD2 continuously decreases in size. At some far enough distance, the image 120 of the laser spot on the photodiodes PD1 and PD2 focuses to a single point onto, and is entirely contained in, only the interior or central photodiode PD1. This point can be calibrated, preferably in a factory, and used to remove the impact of contrast variability of the target. FIG. 6 shows the image 120 of the laser spot entirely covering the central photodiode PD1 and beginning to encroach on the exterior photodiode PD2. Conversely, as the symbol 20 is moved closer and closer to the window 36, the image 120 of the laser spot focused on the photodiodes PD1 and PD2 continuously increases in size until the image 120 completely covers the central photodiode PD1 and begins to also cover the exterior photodiode PD2 as well. FIG. 7 shows the image 120 of the laser spot entirely covering the central photodiode PD1 and also substantially covering the exterior photodiode PD2.

The ratio of the second magnitude of the second output signal generated by the external photodiode PD2 compared to the first magnitude of the first output signal generated by the internal photodiode PD1 is a direct indication of the working distance to the symbol 20 being scanned. Once this ratio is measured, the working distance to the symbol 20 can be calculated by the controller 32, and various optimized reading parameters and values of reader performance, such as gain, bandwidth, AGC, scan angle, and laser power, can be applied by the controller 32, preferably by retrieval from a look-up table.

Thus, as shown in FIG. 4, the controller 32 can modify the reading parameters as a function of the determined working distance by, for example, turning the AGCs 80 or 82 on or off over the control lines 82, 94; and/or adjusting the bandwidth of the receiver filters 84 or 96 over the control lines 86, 98; and/or adjusting the gain of the receiver amplifiers 88 or 100 over the control lines 90, 102; and/or adjusting the scan angle over which the laser beam is scanned by the scan component 46 over the control line 114; and/or adjusting a power level of the laser beam 18 that is emitted by the laser 16 and driven by a laser drive 118 over the control line 116.

The laser drive circuit 118 includes a laser power regulator, which is a closed loop feedback system that maintains a constant optical output power by varying the applied forward current $I_C$ to the laser light source 16. The laser light source 16 includes a laser diode 16A and a monitor photodiode 16B. A small fraction of the output laser light is coupled into the monitor photodiode 16B within the enclosed laser light source 16. This induces a photocurrent in the monitor photodiode 16B that is proportional to the laser output power. This photocurrent is a negative feedback signal that is used to regulate the laser's output power. Thus, the controller 32 can either turn the laser light source 16 on to an energized state, or turn the laser light source 16 off to a deenergized state.

As also shown in FIG. 4, the controller 32 also controls the drive motor 48 over the control line 114. The drive motor 48 sweeps the scan component or oscillating scan mirror 46 over a scan angle, which, as noted above, can be narrow for far-away symbols, or wide for close-in symbols.

Figure 8:
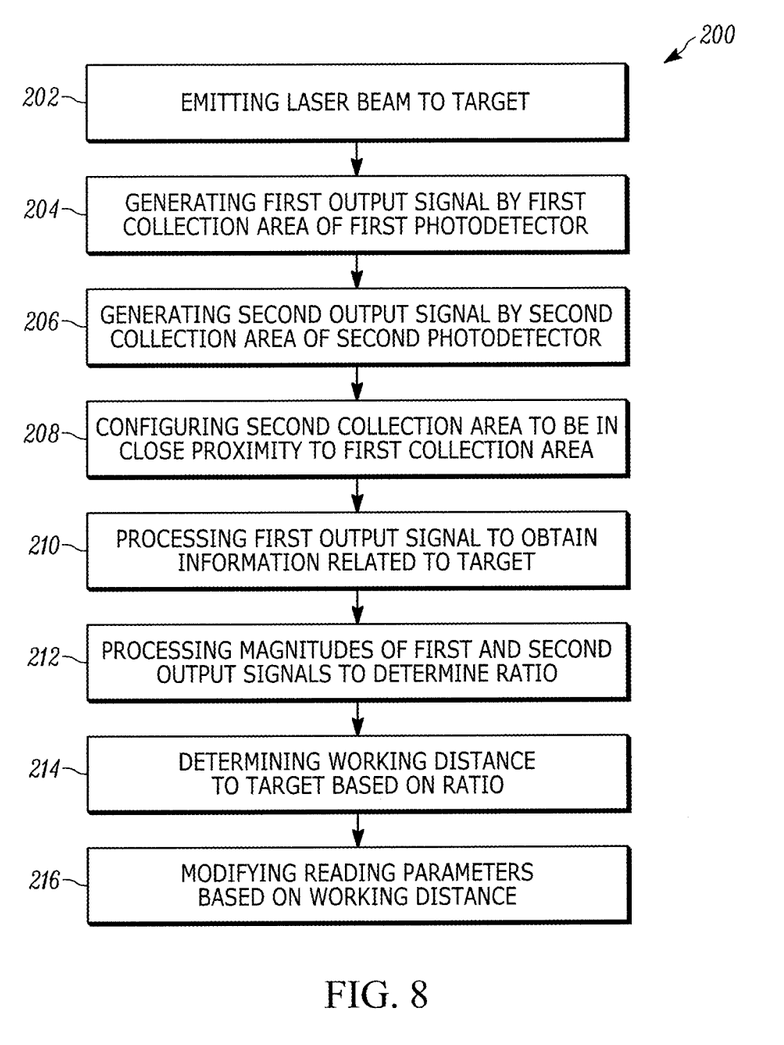
FIG. 8 is a flow chart depicting steps performed in accordance with the method of the present disclosure.

As depicted in the flow chart 200 of FIG. 8, the method of electro-optically reading a target located in a range of working distances, is performed by the following steps: emitting a laser beam 18 from a module 56 to the target 20 for reflection and scattering therefrom as return laser light 22 (step 202). The return laser light 22 is either derived from the laser beam 18 scanned across the target 20 by a scan component in a moving laser beam reader, or from the laser beam 18 that is projected on the target 20 as an aiming pattern in an imaging reader. The method is further performed by positioning a first collection area 60 of a first photodetector PD1 to receive the return laser light 22, and to generate a first analog electrical output signal having a first magnitude upon receipt of the return laser light 22 (step 204); and by positioning a second collection area 62 of a second photodetector PD2 to receive the return laser light 22, and to generate a second analog electrical output signal having a second magnitude upon receipt of the return laser light 22 (step 206). The second collection area 62 is configured to be in close proximity to, or at least partly surround, the first collection area 60 (step 208). The first output signal is processed to obtain information related to the target 20 (step 210). The first and the second output signals are processed to determine a working distance to the target 20 from the module 56, and one or more reading parameters by which the reading is performed are modified. In a preferred embodiment, the first and the second output signals are processed to determine a ratio of the second magnitude to the first magnitude (step 212). The working distance to the target 20 from the module 56 is determined based on the determined ratio (step 214). One or more of the reading parameters are modified, preferably in real-time, based on the determined working distance (step 216).

In the foregoing specification, specific embodiments have been described. However, one of ordinary skill in the art appreciates that various modifications and changes can be made without departing from the scope of the invention as set forth in the claims below. For example, the auxiliary controller 110 need not be a separate component, but can, and preferably is, integral with the controller 32. The working distance can be collected from PD2, while PD1 continues to process the information signal. The second channel 74 can be combined with the first channel 72 to reduce paper noise and/or speckle noise. The first channel 72 can, in some cases, be turned off to limit the working distance range. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A module for electro-optically reading a target located in a range of working distances relative to the module, the module comprising:
   a support;
   a laser on the support, for emitting a laser beam to the target for reflection and scattering therefrom as return laser light;
   a first photodetector having a first collection area that is positioned on the support to receive the return laser light, the first photodetector being operative for generating a first analog electrical output signal having a first magnitude upon receipt of the return laser light;
   a second photodetector having a second collection area that is positioned on the support to receive the return laser light and that is in close proximity to the first collection area, the second photodetector being operative for generating a second analog electrical output signal having a second magnitude upon receipt of the return laser light; and
   signal processing circuitry on the support and including a controller for processing the first output signal to obtain information related to the target, for processing the first and the second output signals to determine a working distance to the target from the module, and for modifying at least one reading parameter by which the reading is performed based on the determined working distance,
   wherein the signal processing circuitry includes a first receiver channel connected to the first photodetector to process the first output signal, and a second receiver channel connected to the second photodetector to process the second output signal; and wherein the controller is operatively connected to the first and the second receiver channels, for processing the first and the second output signals to determine a ratio of the second magnitude to the first magnitude, for determining the working distance to the target from the module based on the determined ratio, and for modifying the at least one reading parameter based on the determined working distance.

2. The module of claim 1, wherein the first and the second collection areas are generally planar and are situated on a common, generally planar substrate.

3. The module of claim 2, wherein the first and the second collection areas have optical axes that are substantially collinear and that are generally perpendicular to the substrate.

4. The module of claim 1, wherein the first collection area has a plurality of sides, and wherein the second collection area partly surrounds and bounds at least three of the sides of the first collection area.

5. The module of claim 1, wherein the signal processing circuitry includes a digitizer for digitizing the first output signal to generate a digitized signal, and wherein the controller is operative for decoding the digitized signal to obtain the information related to the target.

6. The module of claim 1, and a scan component for scanning the laser beam across the target for reflection and scattering therefrom as the return laser light.

7. The module of claim 6, wherein the signal processing circuitry includes an automatic gain circuit (AGC) in each channel, a receiver filter in each channel and having an adjustable bandwidth, and at least one receiver amplifier in each channel and having an adjustable gain; and wherein the controller is operative for modifying the at least one reading parameter as a function of the determined working distance by at least one of turning the AGC in at least one of the channels on or off, by adjusting the bandwidth of the receiver filter in at least one of the channels, by adjusting the gain of the at least one receiver amplifier in at least one of the channels, by adjusting a scan angle over which the laser beam is scanned by the scan component, and by adjusting a power level of the laser beam emitted by the laser.

8. The module of claim 1, and a solid-state imaging sensor, and aiming optics for modifying the laser beam to form on the target an aiming laser light pattern that is reflected and scattered therefrom as the return laser light.

9. A reader for electro-optically reading a target located in a range of working distances relative to the reader, the reader comprising:
   a housing having a light-transmissive window; and
   a module mounted in the housing, the module including
   a laser for emitting a laser beam through the window to the target for reflection and scattering therefrom as return laser light,
   a first photodetector having a first collection area that is positioned on the module to receive the return laser light through the window, the first photodetector being operative for generating a first analog electrical output signal having a first magnitude upon receipt of the return laser light,
   a second photodetector having a second collection area that is positioned on the module to receive the return laser light through the window and that is in close proximity to the first collection area, the second photodetector being operative for generating a second analog electrical output signal having a second magnitude upon receipt of the return laser light, and
   signal processing circuitry including a controller for processing the first output signal to obtain information related to the target, for processing the first and the second output signals to determine a working distance to the target from the module, and for modifying at least one reading parameter by which the reading is performed based on the determined working distance,
wherein the signal processing circuitry includes a first receiver channel connected to the first photodetector to process the first output signal, and a second receiver channel connected to the second photodetector to process the second output signal; and wherein the controller is operatively connected to the first and the second receiver channels, for processing the first and the second output signals to determine a ratio of the second magnitude to the first magnitude, for determining the working distance to the target from the module based on the determined ratio, and for modifying the at least one reading parameter based on the determined working distance.

10. The reader of claim 9, wherein the first and the second collection areas are generally planar and are situated on a common, generally planar substrate; wherein the first and the second collection areas have optical axes that are substantially collinear and that are generally perpendicular to the substrate; wherein the first collection area has a plurality of sides; and wherein the second collection area partly surrounds and bounds at least three of the sides of the first collection area.

11. The reader of claim 9, wherein the signal processing circuitry includes a digitizer for digitizing the first output signal to generate a digitized signal, and wherein the controller is operative for decoding the digitized signal to obtain the information related to the target.

12. The reader of claim 9, wherein the reader is a laser scanner, and further comprising a scan component on the module, for scanning the laser beam across the target for reflection and scattering therefrom as the return laser light.

13. The reader of claim 12, wherein the signal processing circuitry includes an automatic gain circuit (AGC) in each channel, a receiver filter in each channel and having an adjustable bandwidth, and at least one receiver amplifier in each channel and having an adjustable gain; and wherein the controller is operative for modifying the at least one reading parameter as a function of the determined working distance by at least one of turning the AGC in at least one of the channels on or off, by adjusting the bandwidth of the receiver filter in at least one of the channels, by adjusting the gain of the at least one receiver amplifier in at least one of the channels, by adjusting a scan angle over which the laser beam is scanned by the scan component, and by adjusting a power level of the laser beam emitted by the laser.

14. The reader of claim 9, wherein the reader is an imaging reader having a solid-state imaging sensor, and aiming optics for modifying the laser beam to form on the target an aiming laser light pattern that is reflected and scattered therefrom as the return laser light.

15. A method of electro-optically reading a target located in a range of working distances, the method comprising:
emitting a laser beam from a module to the target for reflection and scattering therefrom as return laser light;
positioning a first collection area of a first photodetector to receive the return laser light, and to generate a first analog electrical output signal having a first magnitude upon receipt of the return laser light;
positioning a second collection area of a second photodetector to receive the return laser light, and to generate a second analog electrical output signal having a second magnitude upon receipt of the return laser light;
configuring the second collection area to be in close proximity to the first collection area;
connecting a first receiver channel to the first photodetector to process the first output signal;
connecting a second receiver channel to the second photodetector to process the second output signal;
processing the first and the second output signals to determine a ratio of the second magnitude to the first magnitude;
processing the first output signal to obtain information related to the target;
processing the first and the second output signals to determine a working distance to the target from the module based on the determined ratio; and
modifying at least one reading parameter by which the reading is performed based on the determined working distance.

16. The method of claim 15, and configuring the first and the second collection areas to be generally planar; situating the first and the second collection areas on a common, generally planar substrate; configuring the first and the second collection areas to have optical axes that are substantially collinear and that are generally perpendicular to the substrate; configuring the first collection area to have a plurality of sides; and configuring the second collection area to partly surround and bound at least three of the sides of the first collection area.

17. The method of claim 15, wherein the modifying of the reading parameters as a function of the determined working distance is performed by at least one of turning an automatic gain circuit (AGC) in at least one of the channels on or off, by adjusting a bandwidth of a receiver filter in at least one of the channels, by adjusting a gain of at least one receiver amplifier in at least one of the channels, by adjusting a scan angle over which the laser beam is scanned, and by adjusting a power level of the laser beam.

* * * * *